US011669098B2

(12) United States Patent
Moshchuk et al.

(10) Patent No.: US 11,669,098 B2
(45) Date of Patent: Jun. 6, 2023

(54) METHOD AND APPARATUS FOR LONGITUDINAL MOTION CONTROL OF A VEHICLE

(71) Applicant: GM Global Technology Operations LLC, Detroit, MI (US)

(72) Inventors: Nikolai K. Moshchuk, Grosse Pointe, MI (US); Kausalya Singuru, Troy, MI (US); David Andrés Pérez Chaparro, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 438 days.

(21) Appl. No.: 16/270,073

(22) Filed: Feb. 7, 2019

(65) Prior Publication Data
US 2020/0257304 A1  Aug. 13, 2020

(51) Int. Cl.
*G05D 1/02*  (2020.01)
*G05D 1/00*  (2006.01)

(52) U.S. Cl.
CPC ......... *G05D 1/0223* (2013.01); *G05D 1/0088* (2013.01); *G05D 1/0278* (2013.01); *G05D 2201/0213* (2013.01)

(58) Field of Classification Search
CPC .. G05D 1/0223; G05D 1/0088; G05D 1/0278; G05D 2201/0213; B60W 2050/0016; B60W 2720/103; B60W 2754/30; B60W 2754/50; B60W 60/0016
See application file for complete search history.

(56) References Cited

U.S. PATENT DOCUMENTS

| | | | | |
|---|---|---|---|---|
| 4,621,705 A | * | 11/1986 | Etoh ..................... | G01S 13/931 180/169 |
| 2002/0173896 A1 | * | 11/2002 | Ishizu .................. | B60K 31/047 701/96 |
| 2012/0215415 A1 | * | 8/2012 | Schramm ............ | B60W 30/143 701/93 |
| 2018/0050675 A1 | * | 2/2018 | Stefan .................. | B60T 8/3295 |
| 2019/0227550 A1 | * | 7/2019 | Yershov ............... | G05D 1/0088 |

(Continued)

FOREIGN PATENT DOCUMENTS

| | | |
|---|---|---|
| CN | 107472246 A | 12/2017 |
| CN | 108473012 A | 8/2018 |

(Continued)

*Primary Examiner* — Nadeem Odeh
(74) *Attorney, Agent, or Firm* — Quinn IP Law

(57) ABSTRACT

Autonomous control of a subject vehicle including a longitudinal motion control system includes determining states of parameters associated with a trajectory for the subject vehicle and parameters associated with a control reference determined for the subject vehicle. A range control routine is executed to determine a first parameter associated with a range control command based upon the states of the plurality of parameters, and a speed control routine is executed to determine a second parameter associated with a speed control command based upon the states of the plurality of parameters. An arbitration routine is executed to evaluate the range control command and the speed control command, and operation of the subject vehicle is controlled to achieve a desired longitudinal state, wherein the desired longitudinal state is associated with a minimum of the range control command and the speed control command.

19 Claims, 3 Drawing Sheets

(56) References Cited

U.S. PATENT DOCUMENTS

| | | | |
|---|---|---|---|
| 2019/0391259 A1* | 12/2019 | Shimizu | G01S 13/931 |
| 2020/0094831 A1* | 3/2020 | Kudo | B60W 50/0097 |
| 2020/0148179 A1* | 5/2020 | Kohlhuber | B60W 30/181 |
| 2020/0207347 A1* | 7/2020 | Ito | G08G 1/165 |

FOREIGN PATENT DOCUMENTS

| | | |
|---|---|---|
| CN | 109085820 A | 12/2018 |
| CN | 109196432 A | 1/2019 |
| DE | 102006056631 A1 | 6/2008 |
| DE | 102009018006 A1 | 12/2009 |
| DE | 102011084606 A1 | 4/2013 |
| DE | 102017213071 A1 | 2/2018 |

* cited by examiner

METHOD AND APPARATUS FOR LONGITUDINAL MOTION CONTROL OF A VEHICLE

INTRODUCTION

Longitudinal motion control describes a driving assistance control system for a subject vehicle that controls various propulsion-related actuators based upon sensed objects that are in a trajectory of the subject vehicle. The propulsion-related actuators may include a propulsion system that generates tractive torque and a braking system that generates braking torque. Sensed objects that are in the trajectory of the subject vehicle may include, by way of example, a forward vehicle in the same lane of travel or a predefined location such as an intersection.

One form of a longitudinal motion control system operates by detecting location and speed of a forward vehicle and operating to adjust speed of the subject vehicle to achieve and maintain a desired distance between the forward vehicle and the subject vehicle and, in some instances, follow a desired speed profile. In one embodiment, the forward vehicle may be detected through a sensing system including a sensor that may be mounted on the front of the subject vehicle. The sensing system may include RADAR, LIDAR, combinations thereof, or another system. The subject vehicle maintains the desired distance by controlling the propulsion system and/or the braking system.

Control capability of known longitudinal motion control systems may be affected by signal noise associated with the location and trajectory of a forward vehicle and/or contours in a travel surface. Control capability of known longitudinal motion control systems may be affected by signal granularity and resolution, which affect accuracy in achieving a stopped condition at a predefined location.

SUMMARY

A subject vehicle capable of autonomous control is described herein, including, e.g., a longitudinal motion control system. A method for autonomously controlling a subject vehicle includes determining states of a plurality of parameters, including parameters associated with a trajectory for the subject vehicle and parameters associated with a control reference determined for the subject vehicle. A range control routine is executed to determine a first parameter associated with a range control command for controlling operation of the subject vehicle based upon the states of the plurality of parameters, and a speed control routine is executed to determine a second parameter associated with a speed control command for controlling operation of the subject vehicle based upon the states of the plurality of parameters. An arbitration routine is executed to evaluate the range control command and the speed control command, and operation of the subject vehicle is controlled to achieve a desired longitudinal state, wherein the desired longitudinal state is associated with a minimum of the range control command and the speed control command.

An aspect of the disclosure includes parameters associated with a control reference determined for the subject vehicle being parameters associated with a finite point on a horizon.

Another aspect of the disclosure includes the parameters associated with a control reference determined for the subject vehicle being parameters associated with a desired stop point for the subject vehicle.

Another aspect of the disclosure includes states of a plurality of parameters further being determining parameters associated with a trajectory for a target vehicle proximal to the subject vehicle.

Another aspect of the disclosure includes executing a speed control routine to determine a speed control command for controlling operation of the subject vehicle based upon the states of the plurality of parameters, determining a desired speed profile, executing a linear quadratic speed control routine to determine a first acceleration command based upon the desired speed profile, determining a desired stop point and a distance to the desired stop point, executing a second speed control routine to determine a second acceleration command based upon the distance to the desired stop point and the desired speed profile, and selecting the first acceleration command as the second parameter associated with the speed control command when the distance to the desired stop point is greater than a threshold distance.

Another aspect of the disclosure includes selecting the second acceleration command as the second parameter associated with the speed control command when the distance to the desired stop point is less than or equal to the threshold distance.

Another aspect of the disclosure includes determining a location of a desired stop point, and executing the second speed control routine to determine the second acceleration command, wherein the second acceleration command is determined to achieve zero vehicle speed at the desired stop point.

Another aspect of the disclosure includes executing the range control routine to determine the range control command for controlling operation of the subject vehicle based upon the states of the plurality of parameters, including determining a range to a finite point on a horizon, determining a range rate, and executing a proportional-derivative control routine to determine the range control command based upon the range and the range rate.

Another aspect of the disclosure includes the proportional-derivative control routine being a critically damped control routine.

Another aspect of the disclosure includes controlling operation of the subject vehicle to accelerate.

Another aspect of the disclosure includes controlling operation of the subject vehicle to decelerate.

Another aspect of the disclosure includes controlling operation of the subject vehicle to achieve a stopped state at a predetermined location.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
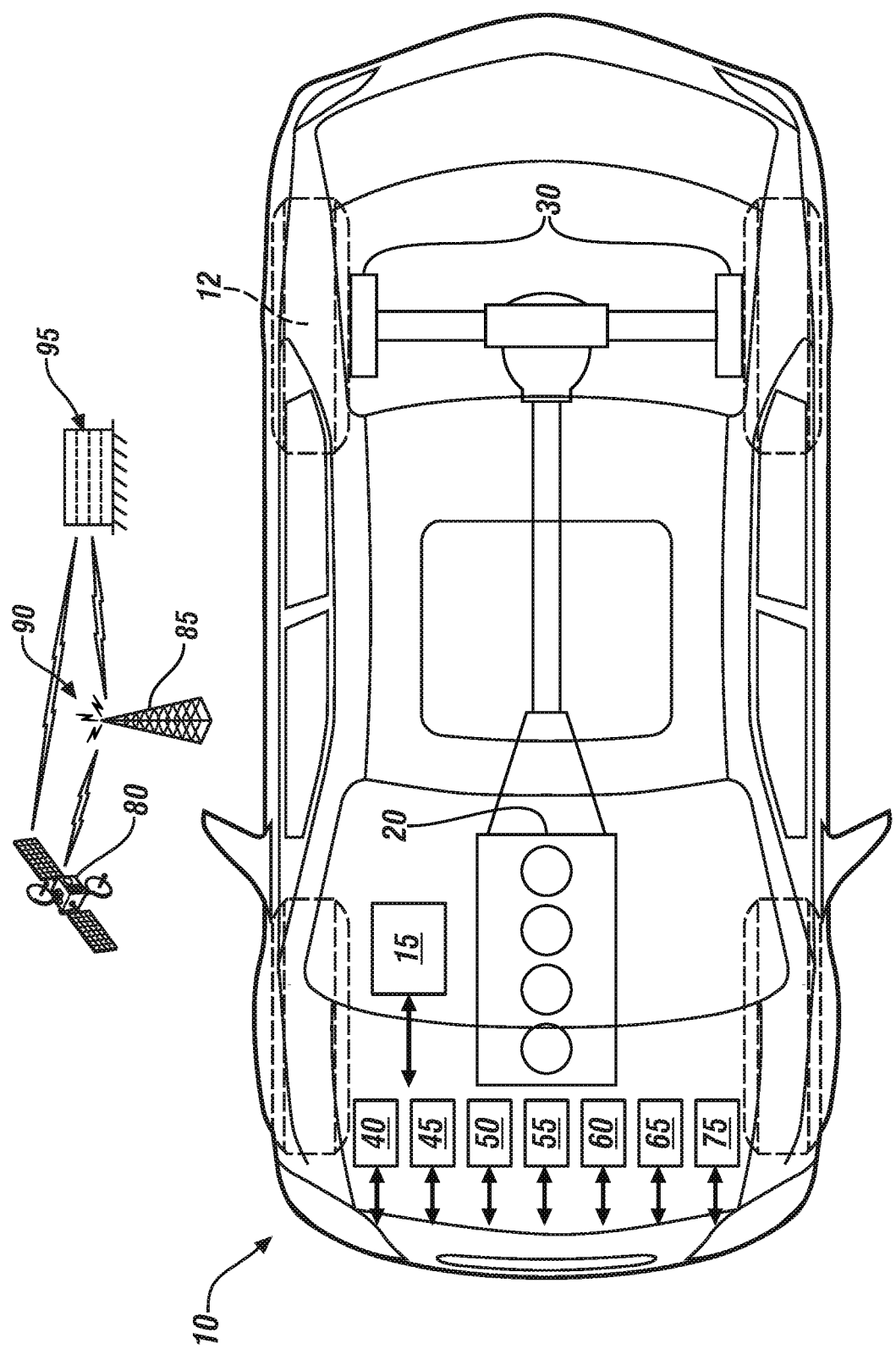
FIG. 1 schematically shows a top view of a vehicle including a configuration for autonomous propulsion control, in accordance with the disclosure.

Referring now to the drawings, wherein the showings are for the purpose of illustrating certain exemplary embodiments and not for the purpose of limiting the same, FIG. 1 schematically shows an embodiment of a vehicle 10 that is configured with an autonomous operating system 45 that is disposed to provide a level of autonomous vehicle operation. In one embodiment and as described herein, the subject vehicle 10 includes a propulsion system 20, a wheel braking system 30, a longitudinal motion control system 40, a Global Position System (GPS) sensor 50, a navigation system 55, a telematics device 60, a spatial monitoring system 65, a human-machine interface (HMI) system 75, and one or more controllers 15. In one embodiment, and as described herein, the longitudinal motion control system 40 may be implemented by an adaptive cruise control system. The propulsion system 20 includes a prime mover, such as an internal combustion engine, an electric machine, a combination thereof, or another device. In one embodiment, the prime mover is coupled to a fixed gear or continuously variable transmission that is capable of transferring torque and reducing speed. The propulsion system 20 also includes a driveline, such as a differential, transaxle or another gear reduction mechanism. Operation of elements of the propulsion system 20 may be controlled by one or a plurality of controllers, which monitors signals from one or more sensors and generates commands to one or more actuators to control operation in a manner that is responsive to an operator request for vehicle acceleration and propulsion.

The wheel braking system 30 includes a device capable of applying braking torque to one or more vehicle wheels 12, and an associated controller, which monitors signals from one or more sensors and generates commands to one or more actuators to control operation in a manner that is responsive to an operator request for braking.

The longitudinal motion control system 40 includes a controller that is in communication with the controllers of the wheel braking system 30, the propulsion system 20, and the HMI system 75, and also in communication with the spatial monitoring system 65. The longitudinal motion control system 40 executes control routines that determine an operator request to maintain vehicle speed at a predefined speed level from the HMI system 75, monitors inputs from the spatial monitoring system 65, and commands operation of the propulsion system 20 and the wheel braking system 30 in response.

The terms controller, control module, module, control, control unit, processor and similar terms refer to various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, an array of parameters, a plurality of executable equations, or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

The subject vehicle 10 includes a telematics device 60, which includes a wireless telematics communication system capable of extra-vehicle communications, including communicating with a communication network system having wireless and wired communication capabilities. The telematics device 60 is capable of extra-vehicle communications that includes short-range vehicle-to-vehicle (V2V) communication and/or vehicle-to-infrastructure (V2x) communication, which may include communication with an infrastructure monitor, e.g., a traffic camera. Alternatively or in addition, the telematics device 60 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 60, and the handheld device executes the extra-vehicle communication, including communicating with an off-board controller 95 via a communication network 90 including a satellite 80, an antenna 85, and/or another communication mode. Alternatively or in addition, the telematics device 60 executes the extra-vehicle communication directly by communicating with the off-board controller 95 via the communication network 90.

The vehicle spatial monitoring system 65 includes a spatial monitoring controller in communication with a plurality of sensing devices. The vehicle spatial monitoring system 65 dynamically monitors an area proximate to the subject vehicle 10 and generates digital representations of observed or otherwise discerned remote objects. The spatial monitoring system 65 can determine a linear range, relative speed, and trajectory of each proximate remote object. The sensing devices of the spatial monitoring system 65 may include, by way of non-limiting descriptions, front corner sensors, rear corner sensors, rear side sensors, side sensors, a front radar sensor, and a camera in one embodiment, although the disclosure is not so limited. Placement of the aforementioned sensors permits the spatial monitoring system 65 to monitor traffic flow including proximate vehicles and other objects around the subject vehicle 10. Data generated by the spatial monitoring system 65 may be employed by a lane mark detection processor (not shown) to estimate the roadway. The sensing devices of the vehicle spatial monitoring system 65 can further include object-locating sensing devices including range sensors, such as FM-CW (Frequency Modulated Continuous Wave) radars, pulse and FSK (Frequency Shift Keying) radars, and LIDAR (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward and/or rear objects including one or more object vehicle(s). Such sensing systems are employed for detecting and locating objects in automotive applications and are useable with autonomous operating systems including, e.g., adaptive cruise control, autonomous braking, autonomous steering and side-object detection.

The sensing devices associated with the spatial monitoring system 65 are preferably positioned within the subject vehicle 10 in relatively unobstructed positions. Each of these sensors provides an estimate of actual location or condition of an object, wherein said estimate includes an estimated position and standard deviation. As such, sensory detection and measurement of object locations and conditions are typically referred to as 'estimates.' The characteristics of these sensors may be complementary in that some may be more reliable in estimating certain parameters than others. The sensing devices may have different operating ranges and angular coverages capable of estimating different parameters within their operating ranges. For example, radar sensors may estimate range, range rate and azimuth location of an object, but are not normally robust in estimating the extent of a detected object. A camera with vision processor is more robust in estimating a shape and azimuth position of the object, but may be less efficient at estimating the range and range rate of an object. Scanning type LIDAR sensors perform efficiently and accurately with respect to estimating range, and azimuth position, but typically cannot estimate range rate, and therefore may not be as accurate with respect to new object acquisition/recognition. Ultrasonic sensors are capable of estimating range but may be less capable of estimating or computing range rate and azimuth position. The performance of each of the aforementioned sensor technologies is affected by differing environmental conditions. Thus, some of the sensing devices may present parametric variances during operation, although overlapping coverage areas of the sensors create opportunities for sensor data fusion. Sensor data fusion includes combining sensory data or data derived from sensory data from various sources that are observing a common field of view such that the resulting information is more accurate and precise than would be possible when these sources are used individually.

The HMI system 75 provides for human/machine interaction, for purposes of directing operation of an infotainment system, the GPS sensor 50, the vehicle navigation system 55, a remotely located service center and the like. The HMI system 75 monitors operator requests and provides information to the operator including status of vehicle systems, service and maintenance information. The HMI system 75 communicates with and/or controls operation of a plurality of in-vehicle operator interface device(s). The HMI system 75 may also communicate with one or more devices that monitor biometric data associated with the vehicle operator, including, e.g., eye gaze location, posture, and head position tracking, among others. The HMI system 75 is depicted as a unitary device for ease of description, but may be configured as a plurality of controllers and associated sensing devices in an embodiment of the system described herein. The in-vehicle operator interface device(s) can include devices that are capable of transmitting a message urging operator action, and can include an electronic visual display module, e.g., a liquid crystal display (LCD) device, a heads-up display (HUD), an audio feedback device, a wearable device and a haptic seat.

The subject vehicle 10 can include an autonomous operating system 45 that is disposed to provide a level of autonomous vehicle operation. The autonomous operating system 45 includes a controller and one or a plurality of subsystems that may include an autonomous steering system, the longitudinal motion control system 40, an autonomous braking/collision avoidance system and/or other systems that are configured to command and control autonomous vehicle operation separate from or in conjunction with operator requests. Autonomous operating commands may be generated to control the autonomous steering system, the longitudinal motion control system 40, the autonomous braking/collision avoidance system and/or the other systems. Vehicle operation includes operation in one of the propulsion modes in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, and the longitudinal motion control system 40. Vehicle acceleration includes a tip-in event, which is a request to increase vehicle speed, i.e., accelerate the subject vehicle 10. A tip-in event can originate as an operator request for acceleration or as an autonomous vehicle request for acceleration. One non-limiting example of an autonomous vehicle request for acceleration can occur when a sensor for the longitudinal motion control system 40 indicates that a vehicle can achieve a desired vehicle speed because an obstruction has been removed from a lane of travel, such as may occur when a slow-moving vehicle exits from a limited access highway. Braking includes an operator request to decrease vehicle speed. Steady-state running includes vehicle operation wherein the subject vehicle 10 is presently moving at a rate of speed with no operator request for either braking or accelerating, with the vehicle speed determined based upon the present vehicle speed and vehicle momentum, vehicle wind resistance and rolling resistance, and driveline inertial drag, or drag torque. Coasting includes vehicle operation wherein vehicle speed is above a minimum threshold speed and the operator request to the accelerator pedal is at a point that is less than required to maintain the present vehicle speed. Idle includes vehicle operation wherein vehicle speed is at or near zero. The autonomous operating system 45 includes an instruction set that is executable to determine a trajectory for the subject vehicle 10, and determine present and/or impending road conditions and traffic conditions based upon the trajectory for the subject vehicle 10.

FIGS. 2, 3, 4, and 5 schematically show details related to a longitudinal motion control routine 200 that is dynamically executed as one or more control routines to achieve accurate vehicle speed tracking and stopping distance, as executed in an embodiment of the subject vehicle 10 described with reference to FIG. 1. This arrangement provides a seamless integration of a complex speed controller 210 and a range controller 220.

Figure 2:
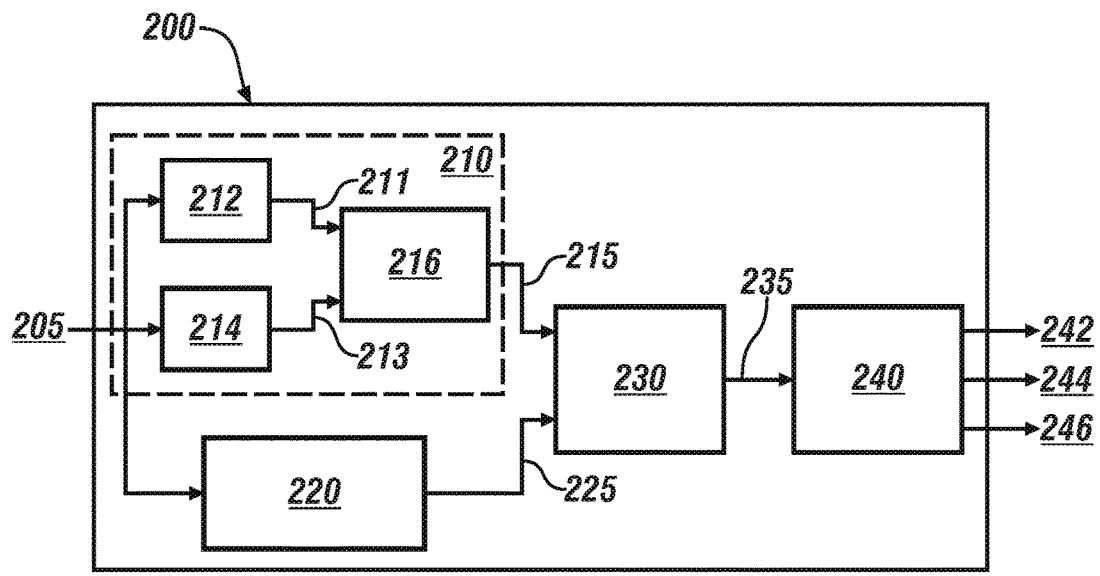
FIG. 2 schematically shows, in block diagram form, a longitudinal motion control routine for executing autonomous control of a vehicle, in accordance with the disclosure.

As shown with reference to FIG. 2, the longitudinal motion control routine 200 includes monitoring a plurality of input parameters 205, which are provided as inputs to the complex speed controller 210 and the range controller 220. The complex speed controller 210 generates a speed control command 215, and the range controller 220 generates a range control command 225, both which are provided as inputs to an arbitration routine 230. The arbitration routine 230 generates a longitudinal control command 235 based thereon, which is provided as an input to a longitudinal control state flow routine 240. The longitudinal control state flow routine 240 generates commands for controlling the subject vehicle 10, including an axle torque command 242, a braking command 244, and ancillary, related commands 246. In one embodiment, the axle torque command 242 may be within a range from zero commanded axle torque, i.e., a coasting state, to a maximum commanded axle torque. In one embodiment, the axle torque command 242 may also include a negative commanded axle torque, wherein the propulsion system 20 exerts a negative axle torque on vehicle wheels 12 in order to decelerate the subject vehicle 10. The negative axle torque command may be related to a downshifting event to assist in vehicle speed management when the subject vehicle is operating in a downhill state. The negative axle torque command may be related to a regenerative braking condition wherein vehicle momentum is converted to electric power for charging of an on-vehicle DC power source (not shown). In one embodiment, the braking command 244 may be within a range from zero braking torque to a maximum achievable braking torque.

The input parameters 205 may include vehicle state measurements, including, e.g., vehicle longitudinal speed, lateral speed, axle torque, steering angle, yaw rate, pitch angle, and transmission gear state, from which a present trajectory for the subject vehicle 10 can be determined. The vehicle state measurements may be directly measured via one or more on-vehicle sensors, and/or determined via measurements of other on-vehicle sensors or off-vehicle sensors, and/or modeled.

The input parameters 205 may include information related to a target vehicle, which may be another vehicle that is proximal to the subject vehicle 10 that is in the same lane of travel as the subject vehicle 10 and is in front of the subject vehicle 10. Target vehicle information may include target vehicle range, target vehicle speed and acceleration, and a range closing rate, from which a trajectory for the target vehicle may be dynamically determined. The information related to the target vehicle may be directly measured via one or more on-vehicle sensors, determined via measurements of other on-vehicle or off-vehicle sensors, communicated from the target vehicle, or modeled, or may be determined as a combination thereof.

The input parameters 205 may include information related to a control reference for the subject vehicle 10. The control reference may be a desired stop point for the subject vehicle 10, a finite point on a horizon, or a target vehicle. The information related to the control reference for the subject vehicle 10 may include a desired speed profile, a stopping distance, and locations and quantity of waypoints along a projected vehicle travel route to the desired stop.

The range controller 220 includes an executable control routine to determine the range control command 225 in a time domain, based upon the input parameters 205. The control routine includes a range control law that is formulated in the time domain that has a control goal of tracking a desired distance to a finite point on a horizon, which may be a target vehicle or another reference point such as a predefined location. In one embodiment, the predefined location may be a stop sign, a traffic control light, or a crosswalk associated with an intersection that is in the trajectory of the subject vehicle 10. In one embodiment, the longitudinal dynamics equation is configured as a proportional-derivative (PD) controller that determines an acceleration command based upon a range and a range rate. In one embodiment, the range control law has the following form:

$$u = K_P d + K_D \dot{d} \qquad [1]$$

wherein:

u represents the range control command 225, i.e., the acceleration command, d represents the range, ḋ represents the range rate, $K_P$ represents a proportional gain, and $K_D$ represents a derivative gain.

The proportional gain ($K_P$) and derivative gain ($K_D$) are functions of a single positive weight (w) and are determined as follows in one embodiment:

$$K_P = w^2, K_D = 2w \qquad [2]$$

This selection of the proportional gain ($K_P$) and derivative gain ($K_D$) operate to establish a critically damped system, which operates to reduce oscillations in the response and minimize time to convergence to a desired range. The weight (w) is vehicle-specific and is calibratable. The range control command 225, i.e., acceleration command u can be employed to control vehicle operation as described herein.

The complex speed controller 210 includes a first speed controller 212 that executes in parallel with a second speed controller 214, and also employs the input parameters 205. The output 211 from the first speed controller 212 and the output 213 from the second speed controller 214 are provided as inputs to a speed control arbitration routine 216, which generates the speed control command 215 based thereon.

The first speed controller 212 includes formulating a longitudinal dynamics equation employing a linear quadratic controller with a finite point on a horizon that is defined in the space domain, as follows. Acceleration a(t) can be defined as follows in EQ. 3:

$$\frac{dV}{dt} \qquad [3]$$

wherein:

V represents vehicle velocity; and t represents time.

A longitudinal dynamics equation can be formulated in a space domain having length or distance as an independent variable. This can be accomplished by converting the relationship shown with reference to EQ. 3 to a space domain, as shown in EQ. 4, as follows:

$$\frac{dV}{dt}\frac{ds}{dt} = u(s) \qquad [4]$$

$$u \equiv a$$

wherein:

s represents distance.

A changing variable z may be defined in relation to the vehicle velocity V, and is analogous to a kinetic energy term, as follows in EQ. 5:

$$z = V^2 \qquad [5]$$

A dynamic equation is defined as follows in EQ. 6:

$$\frac{dz}{ds} \qquad [6]$$

and $$z_j^{desired} = V_j^2/2$$

wherein j represents a finite point on a horizon that is discretized in space.

Figure 3:
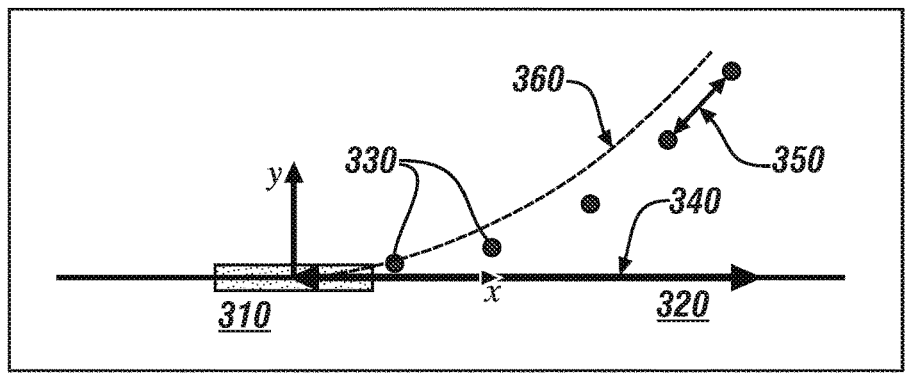
FIG. 3 graphically shows relationship between a time domain and a distance domain associated with operation of the subject vehicle described with reference to FIG. 1, in accordance with the disclosure.

The relationship between a time domain and a space domain is graphically illustrated with reference to FIG. 3, which includes a time domain 310, a distance domain 320, and plurality of discretized points 330 each being defined as ($x_j$, $y_j$, $V_j$), a trajectory 360, control horizon 340, and a distance $\Delta s = \tau V$ 350 between the discretized points 330, wherein t is in the order of magnitude of 0.1 seconds in one embodiment.

A cost function J is defined as follows in EQ. 7:

$$J = \frac{1}{N}\sum_{i=1}^{N} w_j^{track}(z_j - z_j^{desired})^2 + w_j^{control} u_j^2 \qquad [7]$$

wherein:

$w_j^{track}$ represents a first tuning weight, and $w_j^{control}$ represents a second tuning weight.

A control goal can be introduced, to minimize J(z, zj, uj) of EQ. 7 in a manner that includes finding an optimal value for the acceleration term $u_j$, i.e., output 211.

The second speed controller 214 also employs the input parameters 205 and a desired stop point for the subject vehicle 10 to determine the output 213, wherein the desired stop point is a predefined location associated with an intersection in the trajectory of the target vehicle 10 which the target vehicle is expected to achieve a zero-velocity or stopped state. The output 213 from the second speed controller 214 is also an acceleration term.

Referring again to the complex speed controller 210 shown in FIG. 2, the output 211 from the first speed controller 212 and the output 213 from the second speed controller 214 are provided as inputs to the speed control arbitration routine 216, along with the desired stop point for the subject vehicle 10. The speed control arbitration routine 216 determines a distance to a stop point, which is a calculated distance between the present position of the subject vehicle 10 and the desired stop point for the subject vehicle 10. When the distance to the stop point is less than a threshold distance, the speed control arbitration routine 216 selects the output 213 from the second speed controller 214 as the speed control command 215. Otherwise, when the distance to the stop point is greater than the threshold distance, the speed control arbitration routine 216 selects the output 211 from the first speed controller 212 as the speed control command 215.

The speed control command 215 and the range control command 225 are input to the arbitration routine 230, the operation of which may be described with reference to FIG. 4.

Figure 4:
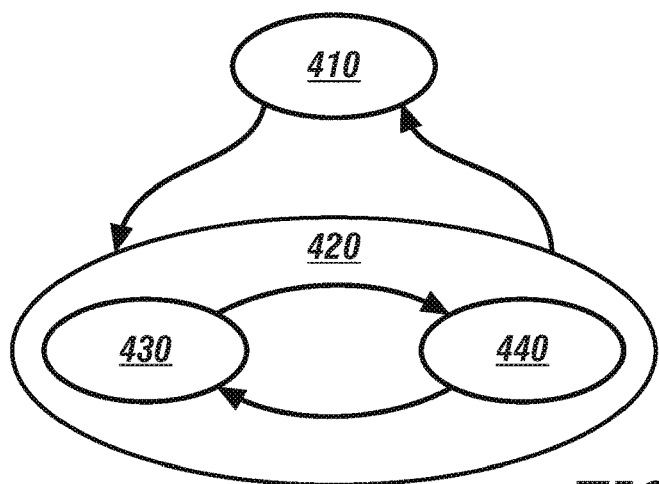
FIG. 4 schematically shows a state-flow diagram associated with arbitration and switching between a speed control routine and a range control routine for controlling longitudinal motion of a vehicle, in accordance with the disclosure.

FIG. 4 schematically shows a state flow diagram associated with arbitration to determine control of longitudinal motion of an embodiment of the subject vehicle 10 that is described with reference to FIG. 1. Two high level states are shown, including a standby state 410 and a longitudinal control state 420. Activation of an associated transition between the standby state 410 and the longitudinal control state 420 are controlled as follows. The standby state 410 is activated when operation in the autonomous mode is deactivated and the vehicle operator is generating operator requests to control vehicle operation. This may occur, for example, when the longitudinal motion control system 40 is disabled. The operator requests include requests associated with controlling vehicle acceleration, braking and/or steering. Operator requests can be generated based upon operator inputs to the accelerator pedal, the brake pedal, the steering wheel, and the transmission range selector, with the longitudinal/autonomous control disabled. The longitudinal control state 420 is activated when operation in the autonomous mode is activated, i.e., when the vehicle operator has ceded control of vehicle operation to the autonomous controller by enabling operation of the longitudinal motion control system 40.

The longitudinal control state 420 includes two sub-states, including a speed control state 430 and a range control state 440. The speed control state 430 commands and controls operation of the subject vehicle 10 via the longitudinal motion control system 40 in response to the speed control command 215, which may be determined as described with reference to FIG. 2 and EQS. 3-7. The range control state 440 commands and controls operation of the subject vehicle 10 via the longitudinal motion control system 40 in response to the range control command 225, which may be determined as described with reference to the longitudinal motion control routine 200 described with reference to FIG. 2 and EQS. 1 and 2.

Arbitration while operating in the longitudinal control state 420 includes selecting a minimum value of the speed control command 215 and the range control command 225, and transitioning to control operation of the longitudinal motion control system 40 based thereon.

The subject vehicle 10 and the longitudinal motion control system 40 are controlled in the speed control state 430 when the speed control command 215 is less than the range control command 225, or when the distance to the desired stop point is greater than the threshold. Referring again to FIG. 2, the speed control command 215 is selected as the longitudinal control command 235 in this situation.

The subject vehicle 10 and the longitudinal motion control system 40 are controlled in the range control state 440 when the speed control command 215 is greater than the range control command 225 and when the distance to the desired stop point is less than the threshold. Referring again to FIG. 2, the range control command 225 is selected as the longitudinal control command 235 in this situation.

Referring again to FIG. 2, the arbitration routine 230 generates the longitudinal control command 235 based thereon, which is provided as an input to a longitudinal control state flow routine 240.

Figure 5:
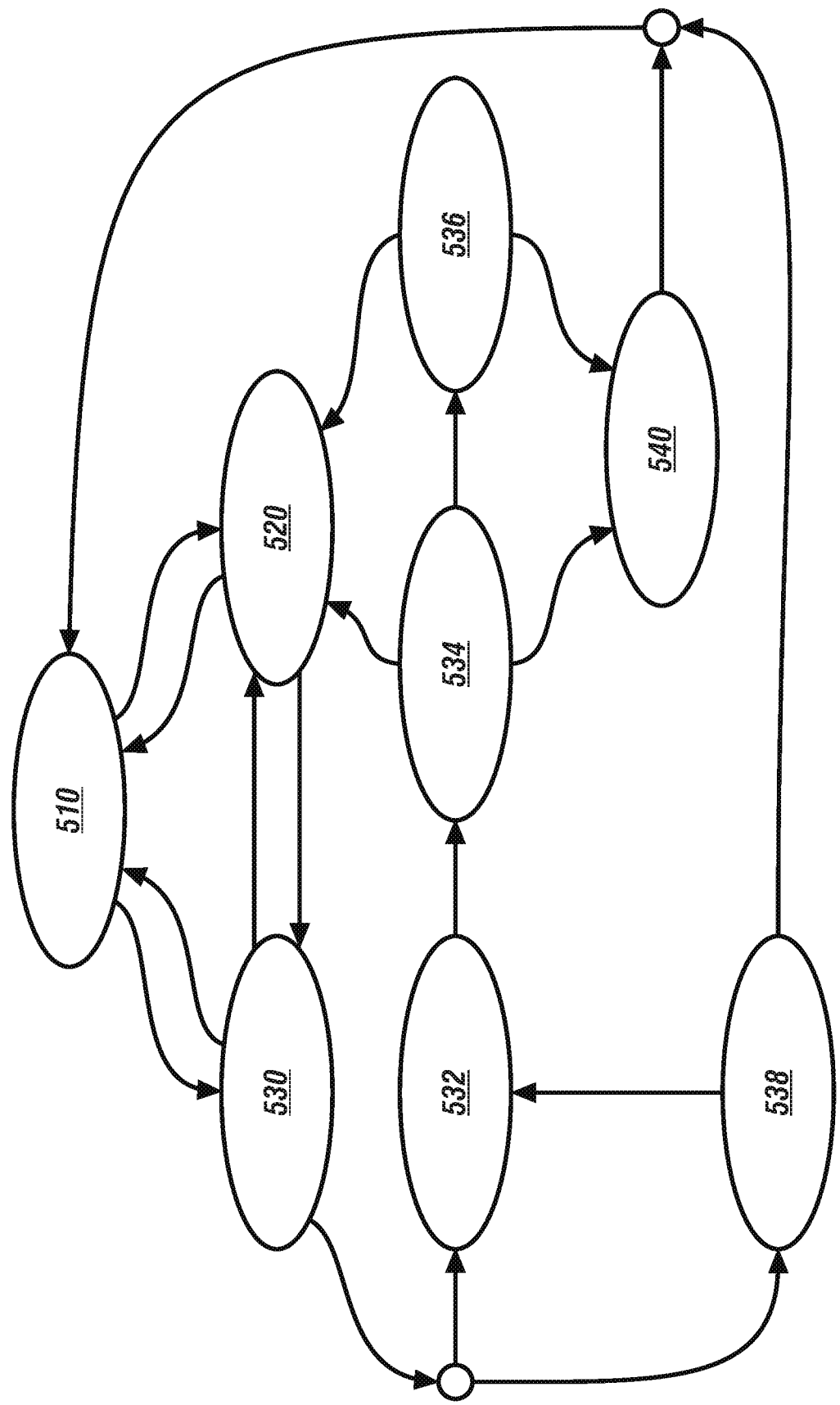
FIG. 5 schematically shows a state-flow diagram associated with longitudinal motion control of a vehicle in accordance with the disclosure.

The longitudinal control state flow routine 240 generates commands for controlling the subject vehicle 10 based upon the longitudinal control command 235, including determining the axle torque command 242, the braking command 244, and ancillary, related commands 246. The ancillary, related commands 246 may include control commands to electric motors to operate as generators to provide vehicle braking that is in the form of regenerative braking. The ancillary, related commands 246 may include transmission gear range selection commands FIG. 5 schematically shows a state-flow diagram associated with longitudinal motion control of an embodiment of the subject vehicle 10 in response to the longitudinal control command 235, wherein the subject vehicle 10 is described with reference to FIG. 1, and the longitudinal control command 235 is determined employing the longitudinal motion control routine 200 that described with reference to FIG. 2. Execution of the state-flow diagram associated with longitudinal motion control of an embodiment of the subject vehicle 10 can be implemented as part of the longitudinal motion control routine 200. States associated with longitudinal motion control include a standby state 510, which is analogous to the standby state 410 shown with reference to FIG. 4. The standby state 510 may be activated when vehicle operation in the autonomous mode is deactivated, i.e., when the longitudinal motion control system 40 is disabled and the vehicle operator is generating operator requests to control vehicle operation.

States related to vehicle operation when the autonomous mode is activated, i.e., when the longitudinal motion control system 40 is enabled and the longitudinal motion control routine 200 is activated, include an accelerating state 520 and a braking state 530.

The vehicle operation transitions from the standby state 510 to the accelerating state 520 when the longitudinal motion control routine 200 has been activated and the longitudinal control command 235 is greater than zero.

The vehicle operation transitions from the standby state 510 to the braking/deceleration state 530 when the longitudinal motion control routine 200 has been activated and the longitudinal control command 235 is less than or equal to zero.

In addition to the main braking/deceleration state 530, there are a plurality of additional braking deceleration states when the vehicle is in the vicinity of a desired stop point, including brake-to-stop state 532, rapid-slowdown-to-stop state 538, hold-at-stop state 534, park-brake-at-stop state 536, and move-away-from-stop state 540. In addition to the main braking/deceleration state 530, there are a plurality of additional braking deceleration states when the subject vehicle 10 is in the vicinity of a desired stop point.

Additional braking/deceleration states may be activated when the trajectory of the subject vehicle 10 indicates that the subject vehicle 10 is proximal to and approaching a desired stop point. The brake-to-stop state 532 can be activated when the vehicle speed is sufficiently low enough to effect a complete stop. The rapid-slowdown-to-stop state 538 can be activated when the vehicle speed is not yet sufficiently low enough to effect a complete stop. The rapid-slowdown-to-stop state 538 can transition to the brake-to-stop state 532 when the vehicle speed is sufficiently low enough to effect a complete stop and the subject vehicle 10 is proximal to the desired stop point.

When the subject vehicle 10 has achieved the stop state in the brake-to-stop state 532, the subject vehicle 10 can transition to the hold-at-stop state 534 and transition to a park-brake-at-stop state 536 after a period of time. The subject vehicle 10 can transition to the move-away-from-stop state 540 when conditions warrant, such as in response to an acceleration command from the autonomous vehicle controller or an operator command for acceleration.

The execution of the state-flow diagram associated with longitudinal motion control of an embodiment of the subject vehicle 10 can be implemented as part of the longitudinal motion control routine 200 that provides a comprehensive State transition that enables accurate braking distance determination and control, and hold times at stop events, thus minimizing or eliminating vehicle operation at creep speeds at stop signs and traffic lights. Furthermore, desired brake commands can be achieved by transitioning between normal and rapid slow down based on desired velocity, and also may operate to achieve a full vehicle stop condition at the stop sign under various circumstances by compensating for latencies between measurement and actuator action due to the actuator delays.

The routine 200 provides a longitudinal motion control routine to control vehicle operation in a manner that includes tracking a desired speed profile, stopping at a desired stop point, e.g., a stop sign, and maintaining safe distance to a target vehicle using range control, including managing state transitions associated therewith.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for autonomously controlling a subject vehicle, including:
   determining states of a plurality of parameters, including parameters associated with a trajectory for the subject vehicle and parameters associated with a control reference determined for the subject vehicle, wherein the parameters associated with the control reference determined for the subject vehicle comprise parameters associated with a desired stop point for the subject vehicle;
   executing a range control routine to determine a first parameter associated with a range control command for controlling operation of the subject vehicle based upon the states of the plurality of parameters; wherein the range control routine determines the first parameter in a time domain;
   executing a speed control routine to determine a second parameter associated with a speed control command for controlling operation of the subject vehicle based upon the states of the plurality of parameters; wherein the speed control routine determines the second parameter in a space domain;
   executing an arbitration routine to evaluate the range control command and the speed control command;
   controlling operation of the subject vehicle to achieve a desired longitudinal state, wherein the desired longitudinal state is associated with a minimum of the first parameter associated with the range control command and the second parameter associated with the speed control command, wherein controlling operation of the subject vehicle includes controlling a transmission gear range to achieve the desired longitudinal state; and
   transitioning operation of the subject vehicle to a hold-at-stop state and activating a park brake after a period of time subsequent to achieving the desired stop point.

2. The method of claim 1, wherein the parameters associated with the control reference determined for the subject vehicle comprise parameters associated with a finite point on a horizon.

3. The method of claim 1, wherein determining the states of the plurality of parameters further include determining parameters associated with a trajectory for a target vehicle proximal to the subject vehicle.

4. The method of claim 1, wherein executing the speed control routine to determine the speed control command for controlling operation of the subject vehicle based upon the states of the plurality of parameters includes:
   determining a desired speed profile;
   executing a linear quadratic speed control routine to determine a first acceleration command based upon the desired speed profile;
   determining the desired stop point;
   determining a distance to the desired stop point;
   executing a second speed control routine to determine a second acceleration command based upon the distance to the desired stop point and the desired speed profile; and
   selecting the first acceleration command as the second parameter associated with the speed control command when the distance to the desired stop point is greater than a threshold distance.

5. The method of claim 4, further comprising selecting the second acceleration command as the second parameter associated with the speed control command when the distance to the desired stop point is less than or equal to the threshold distance.

6. The method of claim 4, wherein determining the distance to the desired stop point comprises determining a geographic location of the desired stop point, and wherein executing the second speed control routine to determine the second acceleration command comprises determining the second acceleration command to achieve zero vehicle speed at the desired stop point.

7. The method of claim 1, wherein executing the range control routine to determine the range control command for controlling operation of the subject vehicle based upon the states of the plurality of parameters includes:
   determining a range to a finite point on a horizon;
   determining a range rate; and
   executing a proportional-derivative control routine to determine the range control command based upon the range and the range rate.

8. The method of claim 7, wherein the proportional-derivative control routine comprises a critically damped control routine.

9. The method of claim 1, wherein controlling operation of the subject vehicle to achieve the desired longitudinal state comprises controlling operation of the subject vehicle to accelerate.

10. The method of claim 1, wherein controlling operation of the subject vehicle to achieve the desired longitudinal state comprises controlling operation of the subject vehicle to decelerate.

11. The method of claim 1, wherein controlling operation of the subject vehicle to achieve the desired longitudinal state comprises controlling operation of the subject vehicle to achieve a stopped state at a predetermined location.

12. A method for controlling longitudinal motion of a subject vehicle, including:
determining states of a plurality of parameters, including parameters associated with a trajectory for the subject vehicle and parameters associated with a control reference determined for the subject vehicle, wherein the parameters associated with the control reference determined for the subject vehicle comprise parameters associated with a desired stop point for the subject vehicle;
executing a range control routine to determine a first parameter associated with a range control command for controlling operation of the subject vehicle based upon the states of the plurality of parameters, wherein the range control routine determines the first parameter in a time domain;
executing a speed control routine to determine a second parameter associated with a speed control command for controlling operation of the subject vehicle based upon the states of the plurality of parameters, wherein the speed control routine determines the second parameter in a space domain;
executing an arbitration routine to evaluate the range control command and the speed control command;
controlling longitudinal motion of the subject vehicle to achieve a desired longitudinal state, wherein the desired longitudinal state is associated with a minimum of the first parameter associated with the range control command and the second parameter associated with the speed control command, wherein controlling operation of the subject vehicle includes controlling a transmission gear range to achieve the desired longitudinal state; and
transitioning operation of the subject vehicle to a hold-at-stop state and activating a park brake after a period of time subsequent to achieving the desired stop point.

13. The method of claim 12, wherein the parameters associated with the control reference determined for the subject vehicle comprise parameters associated with a finite point on a horizon and parameters associated with the desired stop point for the subject vehicle.

14. The method of claim 12, wherein determining the states of the plurality of parameters further include determining parameters associated with a trajectory for a target vehicle proximal to the subject vehicle.

15. The method of claim 12, wherein executing the speed control routine to determine the speed control command for controlling operation of the subject vehicle based upon the states of the plurality of parameters includes:
determining a desired speed profile;
executing a linear quadratic speed control routine to determine a first acceleration command based upon the desired speed profile;
determining the desired stop point;
determining a distance to the desired stop point;
executing a second speed control routine to determine a second acceleration command based upon the distance to the desired stop point and the desired speed profile,
selecting the first acceleration command as the second parameter associated with the speed control command when the distance to the desired stop point is greater than a threshold distance; and
selecting the second acceleration command as the second parameter associated with the speed control command when the distance to the desired stop point is less than or equal to the threshold distance.

16. The method of claim 15, wherein determining the distance to the desired stop point comprises determining a location of the desired stop point, and wherein executing the second speed control routine to determine the second acceleration command comprises determining the second acceleration command to achieve zero vehicle speed at the desired stop point.

17. A subject vehicle, comprising:
a propulsion system, a wheel braking system, a longitudinal motion control system, a Global Position System (GPS) sensor, a navigation system, a telematics device, a spatial monitoring system, and a human-machine interface (HMI) system; and
a controller, in communication with the propulsion system, the wheel braking system, the longitudinal motion control system, the Global Position System (GPS) sensor, the navigation system, the telematics device, the spatial monitoring system, and the human-machine interface (HMI) system, the controller including an instruction set, the instruction set executable to:
determine states of a plurality of parameters, including parameters associated with a trajectory for the subject vehicle and parameters associated with a control reference determined for the subject vehicle, wherein the parameters associated with the control reference determined for the subject vehicle comprise parameters associated with a desired stop point for the subject vehicle,
execute a range control routine to determine a first parameter associated with a range control command for controlling operation of the subject vehicle based upon the states of the plurality of parameters, wherein the range control routine determines the first parameter in a time domain,
execute a speed control routine to determine a second parameter associated with a speed control command for controlling operation of the subject vehicle based upon the states of the plurality of parameters, wherein the speed control routine determines the second parameter in a space domain,
execute an arbitration routine to evaluate the range control command and the speed control command,
control operation of the propulsion system, the wheel braking system, and the longitudinal motion control system to achieve a desired longitudinal state, wherein the desired longitudinal state is associated with a minimum of the first parameter associated with the range control command and the second parameter associated with the speed control command, wherein controlling operation of the subject vehicle includes controlling a transmission gear range to achieve the desired longitudinal state, and
transition operation of the subject vehicle to a hold-at-stop state and activate a park brake after a period of time subsequent to achieving the desired stop point.

18. The subject vehicle of claim 17, wherein the parameters associated with the control reference determined for the subject vehicle comprise parameters associated with a finite point on a horizon, parameters associated with the desired stop point for the subject vehicle, and parameters associated with a trajectory for a target vehicle proximal to the subject vehicle.

19. The subject vehicle of claim 17, wherein the instruction set executable to execute the speed control routine to determine the speed control command for controlling operation of the subject vehicle based upon the states of the plurality of parameters includes an instruction set executable to:
- determine a desired speed profile,
- execute a linear quadratic speed control routine to determine a first acceleration command based upon the desired speed profile,
- determine the desired stop point,
- determine a distance to the desired stop point,
- execute a second speed control routine to determine a second acceleration command based upon the distance to the desired stop point and the desired speed profile,
- select the first acceleration command as the second parameter associated with the speed control command when the distance to the desired stop point is greater than a threshold distance, and
- select the second acceleration command as the second parameter associated with the speed control command when the distance to the desired stop point is less than or equal to the threshold distance.

* * * * *